Patented Apr. 3, 1928.

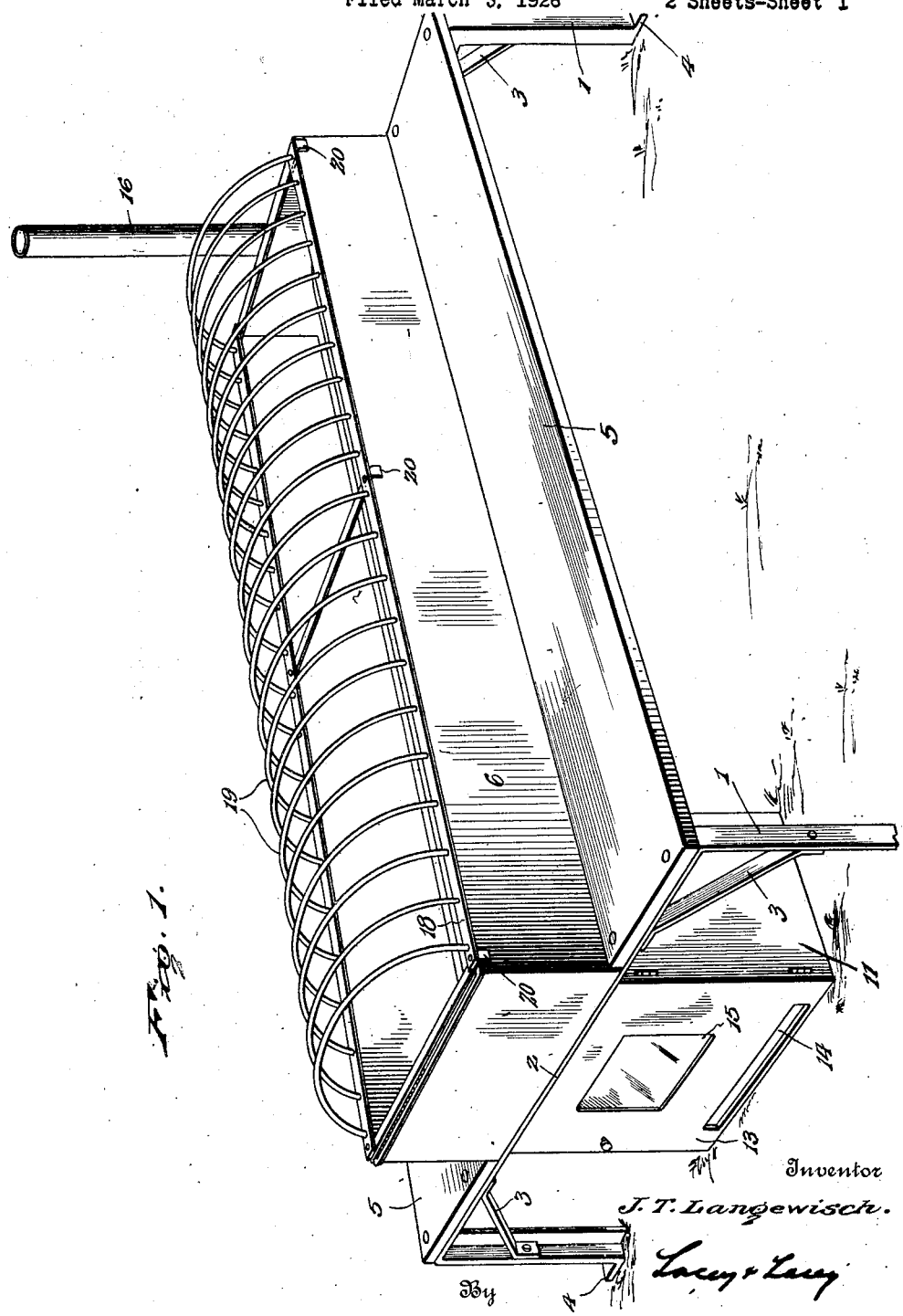

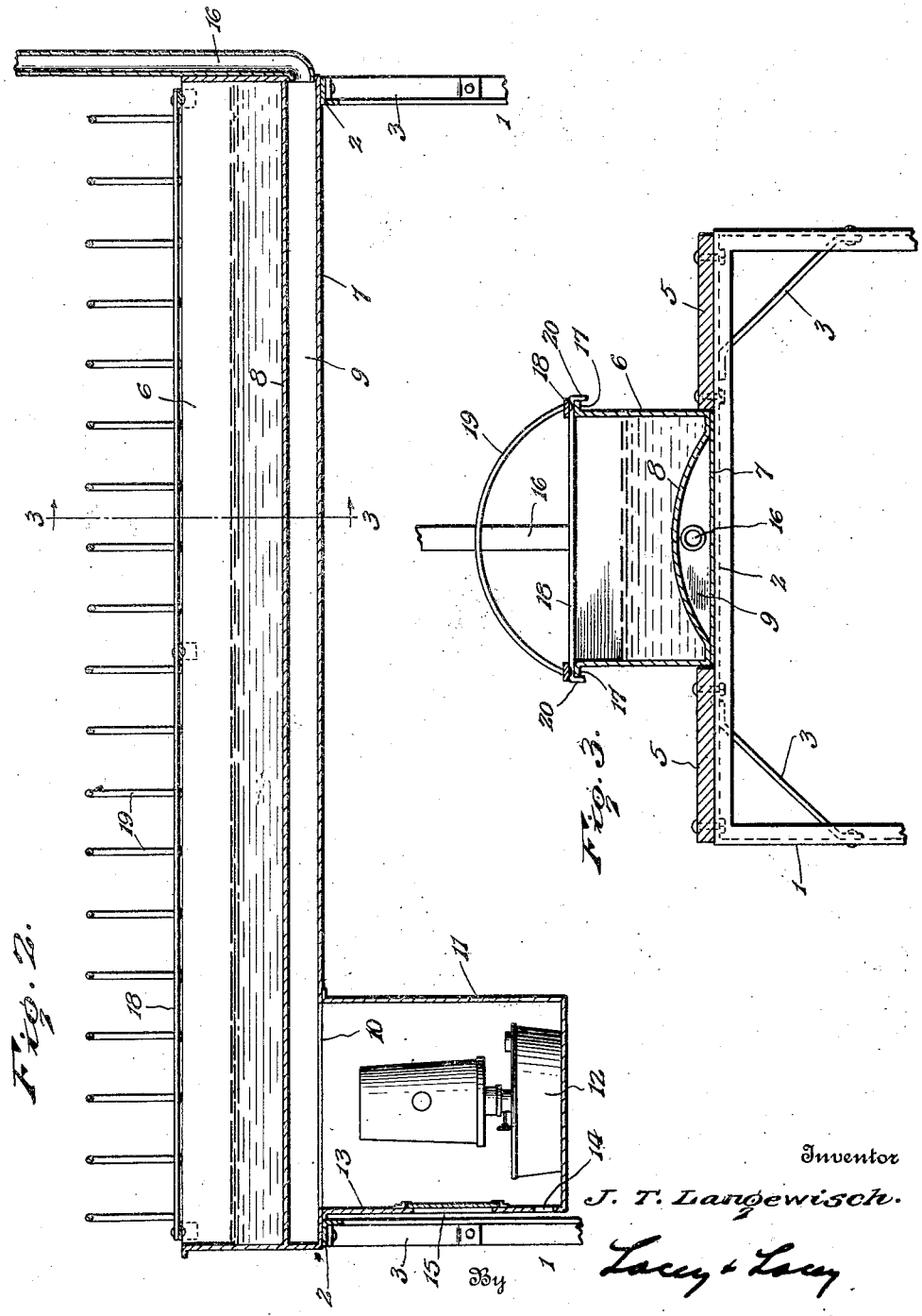

1,664,691

UNITED STATES PATENT OFFICE.

JOHN T. LANGEWISCH, OF SWEET SPRINGS, MISSOURI.

WATERING TROUGH.

Application filed March 3, 1926. Serial No. 92,061.

This invention relates to watering troughs and has for its object the provision of an inexpensive device which may be set up at any place in a field and supported in such a manner that it is not apt to be overturned by the drinking animals and will be so constructed that it will accommodate a lamp or other heating medium whereby freezing of the water will be prevented. Other objects of the invention will appear incidentally in the course of the following description. The invention is illustrated in the accompanying drawings and will be hereinafter fully set forth.

In the drawings:

Figure 1 is a perspective view of a watering trough embodying my present improvements;

Fig. 2 is a central longitudinal section of the same, and

Fig. 3 is a transverse section on the line 3—3 of Fig. 2.

In carrying out the invention, I provide a supporting structure which includes similar end frames 1 constructed of metal bars bent into inverted U-shape, thereby providing depending legs and an upper beam 2 extending between the legs, braces 3 being secured to the beams and the legs across the angles of the same whereby rigidity will be imparted to the structure. Preferably, the lower ends of the legs are bent outwardly to provide feet 4 so that the frames may rest upon the ground without sinking into the same or may be secured upon a platform or other permanent base. Secured to and extending between the supporting frames 1 are platforms 5 upon which the animals may stand when drinking. These platforms consist each of a board of proper dimensions rigidly secured at its ends upon the ends of the beams 2, the inner edges of the said platforms being spaced apart to provide a central opening in which the body 6 of the trough may rest. The said trough body 6 is preferably an oblong rectangular form having a flat bottom 7 which rests at its ends upon the beams 2, as clearly shown in Fig. 2, and has its side walls fitting closely between the inner opposed edges of the platforms 5, as shown in Fig. 3. The trough will thus be firmly supported and the platforms will prevent sidewise shifting of the same. The trough is also provided with an inner or false bottom 8 which is in the form of an arch, as shown clearly in Fig. 3, whereby a space 9 is defined between the bottoms 7 and 8 extending from end to end of the trough. Near the front end of the trough an opening 10 is formed through the bottom 7 and suspended from the said bottom at said opening in any convenient manner is a casing 11 adapted to contain a heater, such as the lamp shown conventionally at 12 in Fig. 2. This casing 11 is preferably provided with a swinging door 13 so that access may be had to the lamp at any time and, near the bottom of the door, an opening 14 is formed therethrough to permit the inflow of air to support combustion. The door is also preferably provided with a glazed opening 15 so that the lamp may be viewed at any time and the condition of the flame easily seen. Extending from the rear end of the trough and in communication with the space 9 is a smoke pipe 16 which rises above the trough so as to carry off the products of combustion and also establish sufficient draft through the device to maintain combustion in the heater.

The top of the trough is open, as clearly shown, and the top edges of the walls of the trough are preferably provided with flanges 17. Resting upon the said flanges is a frame 18 which is like the top of the trough in form and dimension so that it will extend from end to end thereof. Carried by the sides of this frame are a plurality of arched bars or rods 19 which are disposed transversely of the frame and the trough and are spaced equi-distantly along the same. These rods or bars constitute divisors so as to separate the drinking animals and prevent crowding by them. The frame 18 is preferably provided with downturned lugs 20 at intervals in its length to engage against the side walls of the trough and thereby prevent the frame being pushed sidewise from the trough. Endwise movement of this frame will be counteracted by its weight and by the fact also that the animals in drinking will not exert pressure longitudinally of the frame but may exert pressure transversely thereof.

The trough is filled in any convenient manner, and to facilitate the filling the dividing frame may be removed. The device may be set up at any place in the field and may be readily shifted from place to place as circumstances may require. The construction is very simple and inexpensive and at the same time is strong and durable. In cold weather, the heat from the lamp or the like 12 will circulate along the entire bottom of the trough so that freezing of the water will be prevented and the water easily kept at a temperature desirable for use by the stock. The platforms 5 are sufficiently near the ground to permit the animals to easily reach the same when drinking while the frames 1, which carry the platforms, are sufficiently elevated to provide ample accommodation for the heater casing 11 below the trough.

It is to be understood that the boards 5 may be much narrower than shown or even omitted if so desired, and that the divisors 19 may be eliminated or given a form other than the particular form shown.

Having thus described the invention, I claim:

A device of the character described comprising a support having end frames each consisting of a cross bar provided with depending supporting legs, elongated platform members extending between said frames and secured to their cross bars in spaced relation to each other, and a trough resting upon the cross bars of said end frames and fitting snugly between said platform members, said trough being removable from the end frames and held against sliding movement longitudinally of their cross bars by engagement with said platform members.

In testimony whereof I affix my signature.

JOHN T. LANGEWISCH. [L. S.]